United States Patent
Muth

(10) Patent No.: US 8,750,351 B2
(45) Date of Patent: Jun. 10, 2014

(54) CONFIGURATION OF BUS TRANSCEIVER

(75) Inventor: Matthias Muth, Stelle (DE)

(73) Assignee: NXP B.V., Eindhoven (NL)

( * ) Notice: Subject to any disclaimer, the term of this patent is extended or adjusted under 35 U.S.C. 154(b) by 154 days.

(21) Appl. No.: 13/518,507

(22) PCT Filed: Dec. 21, 2010

(86) PCT No.: PCT/IB2010/055981
§ 371 (c)(1),
(2), (4) Date: Jun. 22, 2012

(87) PCT Pub. No.: WO2011/080665
PCT Pub. Date: Jul. 7, 2011

(65) Prior Publication Data
US 2012/0257655 A1 Oct. 11, 2012

(30) Foreign Application Priority Data
Dec. 28, 2009 (EP) ..................................... 09180813

(51) Int. Cl.
*H04B 1/38* (2006.01)
(52) U.S. Cl.
USPC .......... 375/219; 375/222; 455/550.1; 455/74; 455/566
(58) Field of Classification Search
CPC .......... H04B 1/38; H04B 1/401; H04L 12/56; H04W 52/0235
USPC ............................ 375/219; 455/550.1, 74, 566
See application file for complete search history.

(56) References Cited

U.S. PATENT DOCUMENTS

| | | | |
|---|---|---|---|
| 6,141,568 A * | 10/2000 | Sakaguchi | 455/566 |
| 6,556,580 B1 | 4/2003 | Wang et al. | |
| 2002/0025784 A1 * | 2/2002 | Horiguchi | 455/74 |
| 2004/0213289 A1 | 10/2004 | Liu et al. | |
| 2005/0026645 A1 * | 2/2005 | Yamamoto | 455/550.1 |
| 2008/0162682 A1 | 7/2008 | Ramachandran et al. | |
| 2009/0213915 A1 | 8/2009 | Wagner | |
| 2011/0080269 A1 | 4/2011 | Wagner | |
| 2011/0317749 A1 * | 12/2011 | Schedelbeck et al. | 375/219 |

FOREIGN PATENT DOCUMENTS

WO 2006/003540 A1 1/2006

OTHER PUBLICATIONS

International Search Report and Written Opinion for Int'l. Patent Appln. No. PCT/IB2010/055981 (May 24, 2011).

* cited by examiner

Primary Examiner — Eva Puente

(57) ABSTRACT

A transceiver includes a transmit pin configured to receive a signal from a microcontroller, a receive pin configured to transmit a signal to the microcontroller, at least one bus pin configured to transmit and receive signalling to or from the network, a wake-up detector, an acknowledge and/or wake-up generator, and at least one switch is operable to put the transceiver in a first mode of operation. In the first mode of operation the transmit pin is connected to the wake-up detector, and the wake-up detector is configured to activate a wake-up code in accordance with configuration information received at the transmit pin, and the receive pin is connected to an acknowledge and/or wake-up generator, which is configured to provide an acknowledge and/or wake-up signal to the receive pin based on a comparison of actual configuration information stored in the transceiver with the received configuration information from the transmit pin.

10 Claims, 2 Drawing Sheets

CONFIGURATION OF BUS TRANSCEIVER

FIELD OF THE INVENTION

The present disclosure relates to the field of transceivers for coupling a microcontroller or a device to a network, and particularly, although not exclusively, for networks in automobiles.

More particularly, the present invention relates to configuration of bus transceivers

BACKGROUND OF THE INVENTION

The automotive industry is actively searching for measures to reduce the CO2 emission of automotive vehicles by means of power reduction in the electronics present in such vehicles. One possible area where energy consumption could be reduced is the vehicle bus communication, in which all connected electronic control modules are kept active, just because there is bus communication. It is desired to reduce the power consumption by de-activating those control units which are not needed in certain phases of vehicle operation. This requires a new operating mode for bus transceivers, which is called "Partial Networking".

A known approach involves exchanging suitable bus messages, by means of which bus nodes such as stations that are part of a partial network can request each other to change between different states or modes of operation, particularly a sleep mode that saves energy and a normal mode that consumes more energy than the sleep mode. For example, even when the vehicle is parked, individual stations have to be woken up at regular intervals to perform individual functions. As well as it being possible for a change to be made between the sleep mode and the normal mode, it is also desirable for this change to be able to be made selectively, i.e. for individual stations to be able to be actuated separately.

Typically bus message based protocols employed in automotive vehicles are for example the CAN (controller area network) protocol or the LIN (local interconnect network) protocol or the FlexRay protocol.

The CAN protocol is designed specifically for automotive applications which may also be used in other areas such as other types of vehicles, industrial automation and medical equipment. The CAN protocol is standardized in ISO 11898-1 (2003).

Accordingly, the controller area network (CAN) or the CAN-bus allows microcontrollers to communicate with each other within a vehicle. The (bus) protocol controllers connected by the CAN-bus are exchanging typically sensor data, actuator commands, service data and the like, but other components also could be included in the network.

Automotive bus transceivers normally provide a simple interface for mode control of a microcontroller in a network. A typical standard transceiver makes use of up to two dedicated mode control pins, and this means that there are usually not more than four different states of operation.

More complex interfaces, such as that of Inter-Integrated Circuits (I2Cs) or the Serial-Parallel-Interface (SPI), are known to increase the number of control modes for a device. Also, it is known to add additional dedicated mode control pins in excess of the typical two control pins. However, in addition to the fact that these examples may provide a more expensive device, the device also is likely to be incompatible with earlier devices. This means that such a new transceiver may not be provided as a drop-in replacement for known transceivers.

WO 2006/003540 A1 describes a solution for detecting wake-up bus messages in a CAN system, in which a digital bus message on the bus system comprises at least one part that is encoded in a non-bitrate dependent manner in that the value of a bit in that part of the bus message that is encoded in a non-bitrate dependent manner is represented by the lengths of successive dominant and recessive phases of the bit stream signal on the bus line. Thereby it is possible for a transceiver to independently receive and analyze the data transmitted on the bus line and in particular, to individually wake a bus node by means of a given wake-up bus message even when the part of the bus node that is on standby at the relevant point in time does not have an accurate timer and also does not have any knowledge of the bitrate at which the data is transmitted on the bus.

SUMMARY OF THE INVENTION

Firstly, it is noted that the following discussion of additional background in the specification should not necessarily be taken as an acknowledgement that a cited document or background is part of the state of the art or is common general knowledge.

In a transceiver comprising a transmit pin configured to receive a signal from a microcontroller; a receive pin configured to transmit a signal to the microcontroller; a bus pin or multiple bus pins configured to transmit and receive signalling to/from a network; a wake-up detector; and one or more switches operable to put the transceiver in a first mode of operation, in which the transmit pin is connected to the wake-up detector that is configured to activate or to be set a configuration information, such as for example a wake-up code, in accordance with a signal received at the transmit pin.

In this way, the transceiver, in particular the wake-up detector of the transceiver, can be configured in accordance with signals received at the transmit pin on a device-side of the transceiver. Further, by configuring the transceiver in accordance with a signal received at the device-side of the transceiver, as opposed to at the network-side of the transceiver, it is possible to take advantage of a less noisy signal for configuration purposes. This can lead to a more robust transceiver, with an improved accuracy in configuration of the transceiver. Furthermore, this functionality is particular advantageous for selective wake-up operations, and can enable different operating modes to be achieved by a transceiver that has the same pin layout as existing transceivers.

In the first mode of operation, the transmit pin may not be connected to the bus pin/s. This can ensure that any configuration signals that are provided by the device to the transceiver are not provided to the network too. In other words, signals at the transmit pin may not be forwarded to the bus pin/s.

In the first mode of operation, the transmit pin may be connected to the receive pin. This can be advantageous and in some embodiments enable correct operation of a bus protocol controller inside of the device, thereby enabling the bits which are sent out by the device to be read back.

The one or more switches may be further operable to put the transceiver in a second mode of operation. In the second mode of operation the wake-up detector may be connected to the bus pin and configured to monitor signalling received at the bus pin in order to identify the activated wake-up code. The second mode of operation may be considered as a scanning or monitoring mode of operation in which signals on the network are monitored for the wake-up code that was activated in the first mode of operation. In the second mode of operation, the transmit pin may not be connected to the wake-up detector.

In certain embodiments, the transceiver may be configured to change from the first mode of operation to the second mode of operation after a wake-up code has been activated. In other examples, the transceiver may be configured to change from the first mode of operation to the second mode of operation after a predetermined period of time.

The wake-up detector may be configured to cause the transceiver to enter a third mode of operation upon identifying the activated wake-up code; wherein, in the third mode of operation, the transmit pin and receive pin are both connected to the bus pin/s. The third mode of operation may be considered as a "normal" operation mode, in which the device can communicate with the network via the transceiver. The transition to the third mode of operation may be a direct or indirect transition.

In one embodiment, after the transceiver receives the activated wake-up code, it can set the receive pin (RXD) to a LOW level in order to perform a "standard wake-up". In examples where the transceiver includes an inhibit pin (INH), this inhibit pin can be switched on to optionally activate the power supply of a microcontroller connected to the device if applicable.

The transceiver may be configured to change from the third mode of operation to the first or second mode of operation upon receipt of a "go to sleep" signal or "standby" signal. The "go to sleep" or "standby" signal may be received from the standard control pins of the transceiver. The transceiver may return to the first mode of operation in order to reconfigure the wake-up detector and provide a robust transceiver, although in other embodiments this may be considered unnecessary.

The wake-up detector may be configured to activate a wake-up code by identifying a wake-up code in memory that corresponds to a wake-up code represented by the signal received at the transmit pin. The memory may comprise a plurality of potential wake-up codes, and the plurality of wake-up codes may be selected so that they are easily distinguishable from each other and/or easily distinguishable at different bit rates.

The transceiver described herein above provides a complex interface without losing compatibility.

In the above described bus transceiver, an application does not yet know, whether a performed configuration, i.e. activation or selection of a particular wake-up code, of the bus transceiver was successful or not. For instance, an un-configured or even false configured bus transceiver could lead to a system dead-lock or permanent wrong and unwanted wake-ups of the transceiver.

Accordingly, it is one object of the present invention to provide a bus transceiver and respective method of operation of a bus transceiver, which supports improved system reliability, in particular by which a performed configuration of the bus transceiver can be checked on whether the configuration was successful or not.

It is a further object of the present invention to provide a bus transceiver and respective method of operation of a bus transceiver, which enables an application to check, in particular under software control, whether the configuration of the bus transceiver is still valid.

At least one of the fore-going objects may be achieved by a transceiver according to the appended claim 1.

Accordingly, in a first aspect of the invention, there is provided a transceiver, in particular a bus transceiver as a network interface, comprising: a transmit pin configured to receive a signal from a microcontroller; a receive pin configured to transmit a signal to the microcontroller; at least one bus pin configured to transmit and receive signalling to/from a network; a wake-up detector; an acknowledge and/or wake-up generator; and one or more switches operable to put the transceiver in a first mode of operation, wherein, in the first mode of operation, the transmit pin is connected to the wake-up detector, and the wake-up detector is configured to activate a wake-up code in accordance with a configuration information received at the transmit pin, and the receive pin is connected to an acknowledge and/or wake-up generator, which is configured to provide an acknowledge signal to the receive pin based on a comparison of an actual configuration information stored in the transceiver with the received configuration information from the transmit pin.

Accordingly, in the above described first operation mode of the transceiver, in case the wake-up detector is receiving signals from the transmit pin, it may be configured to store the received information and to provide this information to the outside; the information may comprise a number of bits and is provided via a suitable n-bit interface depending on the used detector protocol.

The acknowledge and/or wake-up generator may forward simultaneously or in parallel the signal from the transmit pin to the receive pin in order to provide it as feedback in accordance to the used bus protocol to the bus protocol controller.

Once the complete configuration data is received from the transmit pin, a comparator, which may be adapted for comparison of n-bits in parallel, may be provided which is configured to compare the received information, e.g. bits found by the detector, with the information that may be stored in a suitable memory of the transceiver.

If both information are identical, i.e. all bits of the received and the stored information are matching, the acknowledge and/or wake-up block may be configured to generate a predetermined acknowledge signal, which may be an additional pulse, to the receive pin. The acknowledge signal can be used as protocol acknowledge information.

In a certain embodiment, the acknowledge signal is an additional signal pulse. A pulse length of the additional pulse may be defined by the used protocol and/or derived from the received information, e.g. a configuration information bit stream found or detected on the transmit pin beforehand. Thus, there is no need for special configuration of the used baud rate.

Accordingly, with the discussed acknowledge signal as feedback, the (bus) protocol controller connected to the transceiver can be provided with a feedback on the success of the configuration.

In a further development, instead, the received information, e.g. configuration bits, may be copied into a suitable memory of the transceiver in order to be interpreted as a new configuration setting, i.e. a new wake-up code to be recognized. Alternatively, a particular pre-stored wake-up code may be selected from a plurality of pre-stored wake-up codes in accordance with the received information, i.e. the configuration bits.

If both information are not identical, i.e. the bits of the received and the stored information are different at least in one bit, there is no match. Then, no acknowledge pulse will be generated. When there is no acknowledge pulse generated, the (bus) protocol controller, which may be a part of a microcontroller unit (MCU) connected to transmit pin of the transceiver, may repeat the configuration bus message in order to try to configure the transceiver again.

For example, in a system subject to the CAN protocol, bus message repetition is normal protocol behaviour.

If the second configuration attempt leads to the same configuration bits within the wake-up detector as stored within the memory, the acknowledge and/or wake-up generator may be configured to generate the acknowledge pulse, whereby a successful re-configuration of the wake-up detector is indicated by the provided feedback in form of the acknowledge pulse.

In the above described second operation mode, the wake-up detector is receiving bus signals from the bus line or the bus lines. Then the transceiver does not further interpret the transmit pin input. Instead it monitors the bus lines for a suitable pattern through the receive pin as discussed above.

Accordingly, as soon as the wake-up detector has found or detected known configuration information, e.g. the activated wake-up code, i.e. the bit pattern of the detected wake-up code matches with the corresponding bit pattern stored in the transceiver, the acknowledge and/or wake-up generator may be configured to generate a predetermined signal, e.g. a permanent signal, as wake-up signal at the receive line that may be distinguishable from the acknowledge signal. With the permanent signal on the receive line the microcontroller can distinguish an acknowledge pulse from a bus wake-up event.

In certain embodiments, the transceiver may comprise two bus pins, or any other number of bus pins. The transmit pin, receive pin and bus pins may be standard pins. This means that the transceiver may replace existing transceivers in networks without having to reconfigure any external connections or board layouts. It will be appreciated that the number of bus pins may be dependent upon the type of network that is being used.

For example, CAN and FlexRay networks are dual wire bus systems, whereas LIN or Single-wire CAN have a single bus wire. FlexRay is a standardized automotive network communications protocol meant to be faster and more reliable than CAN.

There may be provided an integrated circuit comprising any transceiver as disclosed herein.

There may further be provided a network comprising: one or more devices; a respective one transceiver connected to each of the one or more devices; and a data bus connecting the one or more transceivers; wherein the transceiver/s are according to the present invention, and the transmit and receive pins of the transceiver are connected to one of the devices and the bus pin is connected to the data bus. The network may be a CAN network, a LIN network or a FlexRay network, for example.

There may be provided an automobile comprising any transceiver or network disclosed herein.

According to a further aspect of the invention, there is provided a method of operating a transceiver, the transceiver comprising: a transmit pin configured to receive a signal from a microcontroller; a receive pin configured to transmit a signal to a microcontroller; a bus pin configured to transmit and receive signalling to/from a network; a wake-up detector; an acknowledgement and/or wake-up generator; and one or more switches operable to put the transceiver in a first mode of operation; the method comprising:

connecting the transmit pin to the wake-up detector; and activating a wake-up code in accordance with a signal received at the transmit pin, and connecting the receive pin to an acknowledge and/or wake-up generator, and providing an acknowledge signal to the receive pin based on comparing of an actual configuration information stored in the transceiver with the received configuration information from the transmit pin.

The method may further comprise one or more of the following steps:

When receiving signals from the transmit pin, the received information may be stored and provided to the outside. For instance, the received information may be, in particular simultaneously, forwarded from the transmit pin to the receive pin in order to feedback the bus protocol to the bus protocol controller.

Once the complete received information, which may be configuration data, is received from the transmit pin, the bits found in the received information may be compared with stored information, e.g. bits stored in a suitable memory of the transceiver.

If the received information matches the stored information, an acknowledge signal, such as an additional pulse, may be generated to the receive pin. The acknowledge signal may be used as protocol acknowledge information. The pulse length of the additional pulse may be adapted by the used protocol and/or derived from the received information, e.g. the configuration bit stream found on the transmit pin beforehand.

Accordingly, with the discussed method, an acknowledge signal can be provided to the bus protocol engine or bus controller as a feedback on the success of the configuration.

If there is no match, the method may comprise simply not generating any acknowledge signal. However, the received information may be interpreted as a new configuration setting and thus be copied into a memory of the transceiver. Alternatively, a particular wake-up code pre-stored in the transceiver may be selected in accordance with the received information, e.g. the configuration bits.

Furthermore, when there is no acknowledge signal generated, a configuration bus message may be repeated to configure the transceiver again. As discussed above, in a system subject to the CAN protocol, bus message repetition is normal protocol behaviour.

If the second configuration attempt leads to the same configuration bits, the acknowledge signal may be generated to indicate that the wake-up detector is configured successfully.

When receiving bus signals from the bus line, the receive pin input is no longer monitored. Instead the bus lines are monitored for a suitable pattern through the bus pin as discussed above. As soon as a known and fixed pattern is found as well as the number of the pattern matches with the corresponding bits in the memory, the permanent wake-up signal may be generated at the receive line. With the permanent signal on the receive pin the microcontroller can distinguish an acknowledge pulse from a bus wake-up event.

The method may further comprise one or more of the following steps: connecting the bus pin to the wake-up detector; and signalling the received wake-up at the receive pin in order to identify the activated wake-up code. The method may comprise connecting the receive pin to the bus pin, and possibly not connecting the transmit pin to the bus pin. In this state, the transceiver can be in a low power mode, i.e. the microcontroller or device may be deactivated, and therefore no signal is received by the transceiver at the transmit pin.

The transceiver can then monitor bus communication and wake-up the microcontroller upon receiving one of the wake-up bus messages that are activated by the configuration.

The method may further comprise connecting both the transmit pin and receive pin to the bus pin upon identifying the activated wake-up code. This may be considered as waking up the microcontroller or device and taking it out of a low power mode.

A basic idea of the proposed solution is to implement an acknowledge generator in the transceiver. The acknowledge generator may be configured to compare the actual configuration of the bus transceiver, which may be stored in a memory or register of the transceiver, with a received configuration information through the transmit pin. If both information are matching in all bit positions, the receive pin of the transceiver can be stimulated with an applicable signal; for example, a dominant output pulse in accordance with the CAN protocol rules in the case of a CAN bus receiver.

Accordingly, the new transceiver is configured to generate an acknowledge message or signal. In systems known up to now, such an acknowledge message or signal is generated by a respective (bus) protocol controller external to the transceiver or the MCU.

With the new acknowledge generator in the new transceiver, the bus controller gets now optionally the feedback from the transceiver, whether the configuration was correct (OK) or not. If there is no acknowledgement, the configuration was not correct and can be repeated. If there is an acknowledgement, the configuration was correct (OK) and the MCU can enter the wanted low power mode and shut down without the risk of having an un-configured transceiver.

Further, by the provided feedback it becomes possible to avoid a situation in which the bus transceiver is un-configured or even false configured, which may cause a system dead-lock or permanent wrong and unwanted wake-ups of the transceiver.

Furthermore, the configuration of the transceiver can be checked at any time without further influencing the system. So, even a cyclically waking-up MCU would be able to check from time to time, whether the configuration is still valid by re-sending the configuration. This can be very important for safety critical applications.

Preferred embodiments and further developments of the invention are defined in the dependent claims of the independent claims. It shall be understood that the apparatus and the method of the invention have similar and/or identical preferred embodiments and advantages.

BRIEF DESCRIPTION OF THE DRAWINGS

These and other aspects of the invention will be apparent from and elucidated with reference to the embodiment(s) described hereinafter. In the following drawings, the figures are schematically drawn and not true to scale, and identical reference numerals in different figures, if any, may refer to corresponding elements. It will be clear for those skilled in the art that alternative but equivalent embodiments of the invention are possible without deviating from the true inventive concept, and that the scope of the invention is limited by the claims only.

DETAILED DESCRIPTION OF EMBODIMENTS

Figure 1:
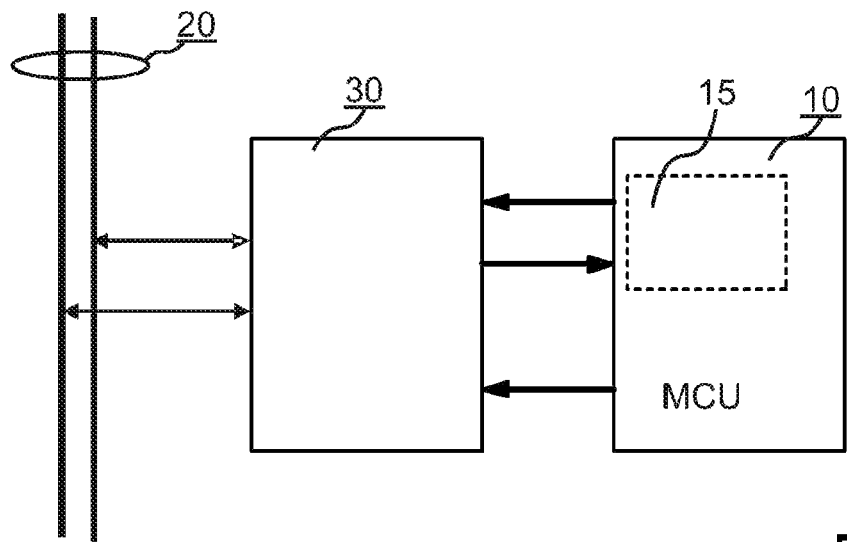
FIG. 1 shows the main application set up in which a transceiver according to the present invention may be used.

FIG. 1 shows the main application set up in which a transceiver according to the present invention may be used. In the following by way of example the improved transceiver is described with respect to a use in a controller area network (CAN); again, this invention is not limited to such a network.

Accordingly, a microcontroller unit (MCU) 10, which in general is a type of electronic control unit (ECU), which is connected via a CAN-bus 20 in order to communicate with another MCU also connected to the CAN-bus 20, for example within a automotive vehicle.

The interface between the MCUs and the CAN bus 20 is established by respective bus transceivers 30. The communication interface between the MCU 10 and the transceiver 30 is such that, in the MCU 10, an applicable configured (bus) protocol controller 15 is embedded, which handles the communication between the MCU 10 and the CAN bus 20 via the transceiver 30.

ECUs connected by the CAN-bus may typically be sensors, actuators, control devices and the like. By further example, in an automotive vehicle such ECUs may be door control units, dashboard controllers, etc.

One or more embodiments described herein relate to a transceiver for connecting an electronic device or microcontroller unit (MCU) to a network, such as a CAN bus network in an automotive vehicle. The transceiver can have a first mode of operation to configure the transceiver so that a device connected to the transceiver can be selectively woken up. It will be appreciated that "selectively woken up" can mean that the device can be woken up independently of other devices on the network.

As discussed above the bus transceiver can be configured through its communication interface, i.e. via the bus. One or more embodiments can use the standard serial communication pins of the transceiver (TXD and RXD) for configuring the transceiver, such as for configuring a selective wake-up code.

In this connection, using the standard serial communication pins can mean that the transceiver is compatible with existing devices and/or networks. In addition, a transceiver described herein can utilize configuration data received at its device-side interface for configuring a selective wake-up detector.

Figure 2:
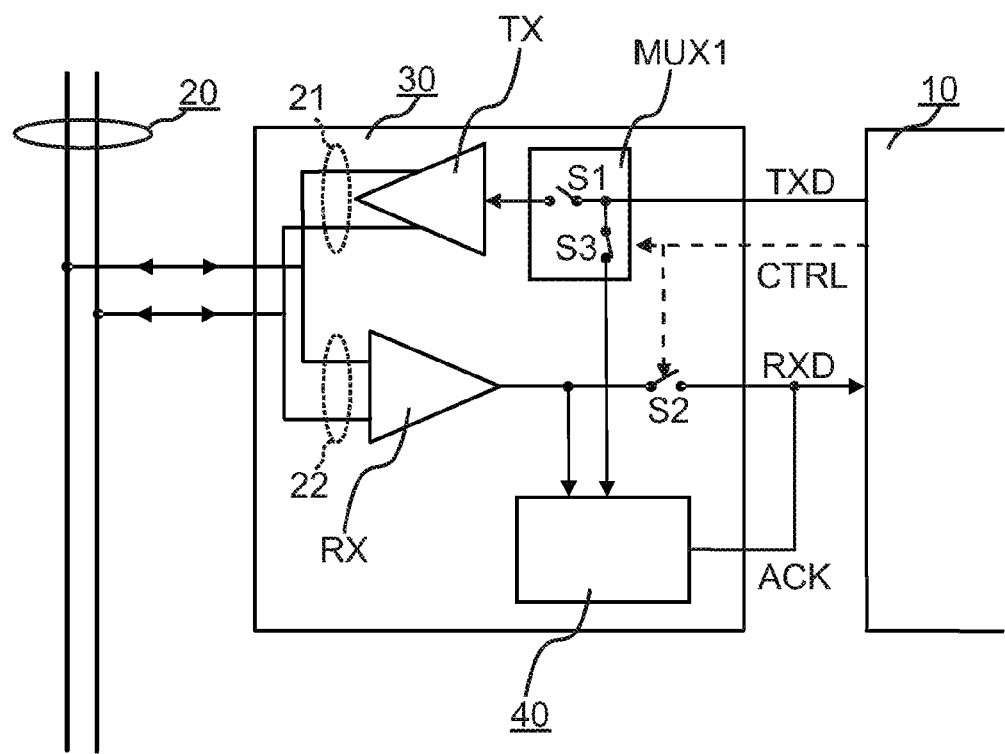
FIG. 2 shows schematically a transceiver in which the present invention may be implemented.

FIG. 2 shows schematically a transceiver 30. The transceiver 30 is connected to a network by a data bus 20 on a network-side of the transceiver 30, and is connected to a microcontroller unit (MCU) 10 on a device-side side of the transceiver 30. The transceiver 30 is connected to the MCU 10 by a transmit pin TXD and a receive pin RXD.

Within the transceiver 30, the data bus 20 is split into two branches: a first branch 21 that is provided to a transmitter component TX which in turn is connected to the transmit pin TXD; and a second branch 22 which is provided to a receive component RX which in turn is connected to the receive pin RXD.

In "normal operation mode", switch S1 is closed and thus forwarding a signal from the transmit pin TXD to the transmit component TX. Switch S2 is closed and thus only forwarding the bus signal from the receive component RX to the receive pin RXD. Switch S3 is open.

The transceiver 30 includes a wake-up detector component 40 that is coupled to the output of the receiver component RX. It is noted that the signal from the wake-up detector component 40 to the receive pin RXD is one-directional and signals the wake-up signal. The wake-up detector 40 is configured to monitor signals received from the network on the data bus 20, and to cause the MCU 10 to wake-up when any wake-up signal is detected on the data bus 20.

The transceiver 30 further comprises a control interface CTRL, which may include two known control pins STBN ("STand-By-Not") and EN ("ENable") (both are not explicitly shown). By the control pins the mode of operation of the transceiver may be controlled. It will be appreciated that the control via STBN and EN is used as an example, and that other interfaces like a Serial-to-Parallel-Interface (SPI) may be used for devices with a higher level of integration, e.g. in a so-called System Basis Chip.

Both control pins STBN and EN are digital control pins that can be directly connected to two general purpose pins of the microcontroller 10. For example, if STBN and EN are both set to a HIGH level, then the transceiver 30 may be set in the so-called "Normal Operation Mode". In the "normal operation mode", a signal received from the MCU 10 at the transmit pin TXD is directly forwarded to the bus 20. In turn, a signal received at the bus 20 is forwarded to the receive pin RXD so that normal communication between the MCU 10 and the bus 20 is possible.

Further, if the control pins STBN and EN are both set to a LOW level, the transceiver 30 enters the so-called "standby operation mode". In the "standby operation mode", the transmitter is disabled so that a signal received from the MCU 10 at the transmit pin TXD is not forwarded to the bus 20. Also a signal received at the bus 20 is not directly forwarded to the receive pin RXD but rather, is sent to the wake-up detector 40. In this configuration, the MCU 10 is in a low power mode to reduce current consumption of the module.

As soon as the wake-up detector 40 recognizes a wake-up signal, then a LOW level signal is provided to the receive pin RXD, and this causes the MCU 10 to awaken. The MCU 10 can then activate the "Normal Operation Mode" by setting the STBN and EN control pins HIGH, and therefore start communication between the MCU 10 and network bus 20.

If the control pin STBN is LOW and the control pin EN is HIGH, then the transceiver 30 enters the so-called "sleep operation mode". The "sleep operation mode" is different from the "standby operation mode" as the transceiver 30 also disables the power supply of the MCU 10, e.g. via a so-called inhibit pin INH (not shown), in the "sleep operation mode". However, the wake-up mechanism is the same as for the "standby operation mode".

Finally, if the control pin STBN is HIGH and the control pin EN is LOW, then a "special operation mode" is entered that can allow reading of a certain flag from the transceiver.

Presently, transceivers are available which only provide a "normal operation mode" and a "standby operation mode", and this can mean that only one pin for configuration is required.

Now, as discussed above, the transceiver 30 can be set via respective switches in different modes of operation. As will be appreciated from the following description, the different modes of operation are discussed in relation to one or more of the switches being in different positions in accordance with signals received at control pins, such as the described control pins STBN and EN (not shown), thereby operably connecting and disconnecting certain components or pins of the transceiver 30 with other components/pins of the transceiver 30.

It will be appreciated that the switches S1, S2, and S3 and blocks shown in the drawing figures should be understood as signal routing diagrams, rather than real circuit diagrams. Hardware or software configurations that operate in the manner of switches S1, S2 and S3 and the blocks are envisioned to be within the scope of this invention.

Accordingly, the transmit pin TXD is connectable via a first switch S1 to the transmit component TX, and the transmit component TX is in turn connected to the transmit branch 21. The receive branch 22 is connected to the receive component RX, which in turn is connectable to the receive pin RXD by a second switch S2. The output of the receive component RX is also connected to a selective wake-up detector 40. In addition, the transmit pin TXD is connectable to the selective wake-up detector 40 by a third switch S3.

Operation of the switches S1, S2, S3 and corresponding data flow through the transceiver 30 will now be described with reference to FIG. 2 with respect to the first, second and third mode of operation of the transceiver 30 respectively.

It will be appreciated that in other embodiments, the switches could be located at different locations and/or a different number of switches can be provided that provide the required functionality of operably connecting and disconnecting components and pins within the transceiver 30 in accordance with the mode of operation of the transceiver 30.

The first mode of operation may be referred to as a "Configuration Operation Mode". In the first mode of operation the selective wake-up detector 40 is configured for subsequently being capable of receiving configuration information from the associated device, i.e. the MCU 10.

As shown in FIG. 2, which shows the transceiver 30 in the first mode of operation the first switch S1 is open, the second switch S2 is open, and the third switch S3 is closed. Thereby a signal from the transmit pin TXD can run through the switch S3 to the wake-up detector 40 which is in this embodiment configured to pass it through to the receive pin RXD.

For example, the control pin STBN (not shown) can be set to a HIGH level, and the control pin EN (not shown) can be set to a LOW level. It will be appreciated that the specific values assigned to the STBN and EN control pins are not limiting, and can be different for different embodiments.

In some embodiments, it can be considered an advantage that the signals that are required by the control pins STBN and EN are the same as for known transceivers, and therefore a transceiver according to an embodiment of the invention can conveniently be used to replace existing transceivers without having to rewire components associated with the transceiver.

During the first mode of operation, a signal is received at the transmit pin TXD from the associated MCU 10 and is provided to the selective wake-up detector 40 via the third switch S3. As an example, the MCU 10 may transmit a configuration signal representative of one of a plurality of wake-up codes that may be stored in a memory associated with the selective wake-up detector 40 so that the selective wake-up detector 40 can activate a specific wake-up code. In such an embodiment, the selective wake-up detector 40 can compare a signal received at the transmit pin TXD with fixed patterns or codes stored in memory in order to identify an intended wake-up code.

Identifying the wake-up code can involve activating the wake-up code for subsequent use in the second and third modes of operation of the transceiver.

If a predetermined list of wake-up codes is associated with the selective wake-up detector 40, the likelihood can be reduced that the wake-up code is misrecognised, and the wake-up codes can be selected so that they are easy to distinguish from each other and/or easy to detect irrespective of the bit rate of the received signal.

In another example, the selective wake-up detector 40 may use the configuration signal received by the transceiver 30 at transmit pin TXD to directly activate a wake-up code represented by the configuration signal. That is, the configuration signal may not necessarily represent one of a set of predetermined codes associated with the wake-up detector 40, and could represent any sequence of information bits or data that comprises any wake-up code.

An advantage provided by the transceiver 30 can be that a configuration signal received at the transmit pin TXD is used to activate a wake-up code, which is in contrast to using a configuration signal received at the network-side bus 20 of the transceiver 30. Embodiments of the invention can utilize the recognition that signals received on the device-side of the transceiver 30 are less noisy, and therefore more accurate, than signals received on the network-side of the transceiver.

Therefore, the third switch S3 is provided for establishing the link between the transmit pin TXD through the wake-up detector 40 to the receive pin RXD via the acknowledge pin ACK within the transceiver 30. In this way, a signal received at the transmit pin TXD can be provided back to the receive pin RXD in order to enable correct operation of a (bus) protocol wake-up detector 40 controller inside of the microcontroller, thereby enabling the bits which are sent out by the MCU 10 to be read back.

Accordingly, the transceiver 30 described herein can be considered as a "Partial Networking" transceiver having a wake-up detector that is more intelligent. Although the transceiver 30 may not be able to "understand" communication received at the bus 20, it may be able to distinguish a certain set of (fixed) wake-up bus messages from normal communication. Therefore, the wake-up detector may be considered as a "selective wake-up detector" or "intelligent wake-up detector", as opposed to a "standard wake-up detector".

In the embodiment of FIG. 2, the first switch S1 is open in the shown "configuration operation mode" so that the signals received at the transmit pin TXD are not passed to the bus 20 and hence onto the network, thereby reducing the chances that the new type of configuration signals that are provided at the transmit pin TXD would disturb bus traffic on the network; that is, outside of the transceiver 30. In other embodiments, the MCU 10 can send any new configuration function or signal to the transceiver 30 by the transmit pin TXD, or can send a special wake-up bus message or any other configuration data directly to the selective wake-up detector 40. The selective wake-up detector 40 can then be used to store information corresponding to the bus message in an internal memory (not shown) of the transceiver 30, or at least derive dedicated configuration bits out of the received and decoded bus message.

In some embodiments, the selective wake-up detector 40 may receive signals from both the transmit pin TXD and the bus 20. On the one hand the selective wake-up detector 40 may be able to listen to/monitor signals from either the transmit pin TXD or the bus 20, but not to both at the same time. On the other hand, the transceiver 30 should not be blind to signals received on the bus 20 during configuration in the first mode of operation. Therefore, it can be advantageous to have the shown connection between the bus 20 and the wake-up detector 40 during the configuration mode in the first mode of operation.

In the second mode of operation, which may be referred to as a "standby operation mode" or "scanning operation mode", the transceiver 30 is scanning signals received at the bus 20 and is awaiting a wake-up signal representative of an instruction to wake-up the associated MCU 10. In a similar way to the "standby operation mode" discussed above, the control pins STBN and EN can be set to a LOW level by the MCU 10 when the transceiver 30 is to enter the second mode of operation.

In contrast to the operation mode shown in FIG. 2, in the second mode of operation, the first switch S1 is still open, the second switch S2 is open, and the third switch S3 is open. In this way, the transmit pin TXD is disconnected from the selective wake-up detector 40, whereas the output of the receive component RX is connected to the selective wake-up detector 40 such that signals received at the bus 20 are provided to the selective wake-up detector 40.

The second switch S2 is open so that the MCU 10 cannot receive data from the network as the receive branch 22 is not complete. It will be appreciated that this is indicative of the device being in a sleep mode.

During the second mode of operation, the selective wake-up detector 40 monitors data received from the network at the bus 20 in order to identify a signal representative of the wake-up code that was activated during the first mode of operation. Upon the selective wake-up detector 40 identifying the activated wake-up code, the selective wake-up detector 40 is configured to cause the transceiver to enter the third mode of operation.

The transceiver 30 can be caused to enter the third mode of operation by initially setting a signal at the receive pin RXD to LOW level, and optionally enabling a power supply to the MCU 10, if required. This provides an indication to the MCU 10 that it should be woken up. In a similar way to that discussed above, the transceiver 30 can cause the MCU 10 to set the control pins STBN and EN (not shown) to a HIGH level, so that the transceiver 30 is put in the so-called Normal Operation Mode.

As to the third mode of operation, in contrast to FIG. 2, the first switch S1 is closed, the second switch S2 is closed, whilst the third switch S3 is open. The third mode of operation may be referred to as a "normal operation mode" because the MCU 10 is in communication with the network in the "normal" way.

The third switch S3 is open so that the transmit pin TXD is not connected to the selective wake-up detector 40. The first switch S1 is closed so that the transmit pin TXD is connected to the bus 20 in the normal way. In addition, the second switch S2 is closed so that the receive pin RXD is also connected to the bus 20 in the normal way. During the third mode of operation, the selective wake-up detector 40 is disabled.

When a signal is provided to the MCU 10 representative of an indication that the MCU 10 should go to sleep, the MCU sets the control pins STBN and EN (not shown) to appropriate values so that the transceiver 30 enters either the first or second mode of operation.

In examples where the transceiver 30 enters the first mode of operation on receipt of a "go to sleep" instruction, the specific wake-up code for the device in question can be reconfirmed by the device as it sends another configuration signal to the transmit pin TXD of the transceiver 30. This can reduce the likelihood that the wake-up codes that are expected on the device-side of the transceiver 30 and the network-side of the transceiver 30 become inconsistent.

In other examples, it may be considered unnecessary to re-enter the first mode of operation after the third mode of operation, and the transceiver 30 can simply re-enter the second or scanning operation mode to monitor for subsequent wake-up signals. In this way, the first mode of operation may be entered less frequently, for example only during start up or periodically after the expiry of a certain period of time since the last occasion that the transceiver 30 was in the first mode of operation.

By the present invention the transceiver is further adapted to provide an indication, by which an application does know, whether a performed configuration of the transceiver, e.g. the activation or selection of a particular wake-up code was successful or not. Thereby it can be ensured that the bus transceiver is correctly configured. Thereby, system dead-locks or permanent wrong and unwanted wake-ups of the transceiver can be avoided.

Figure 3:
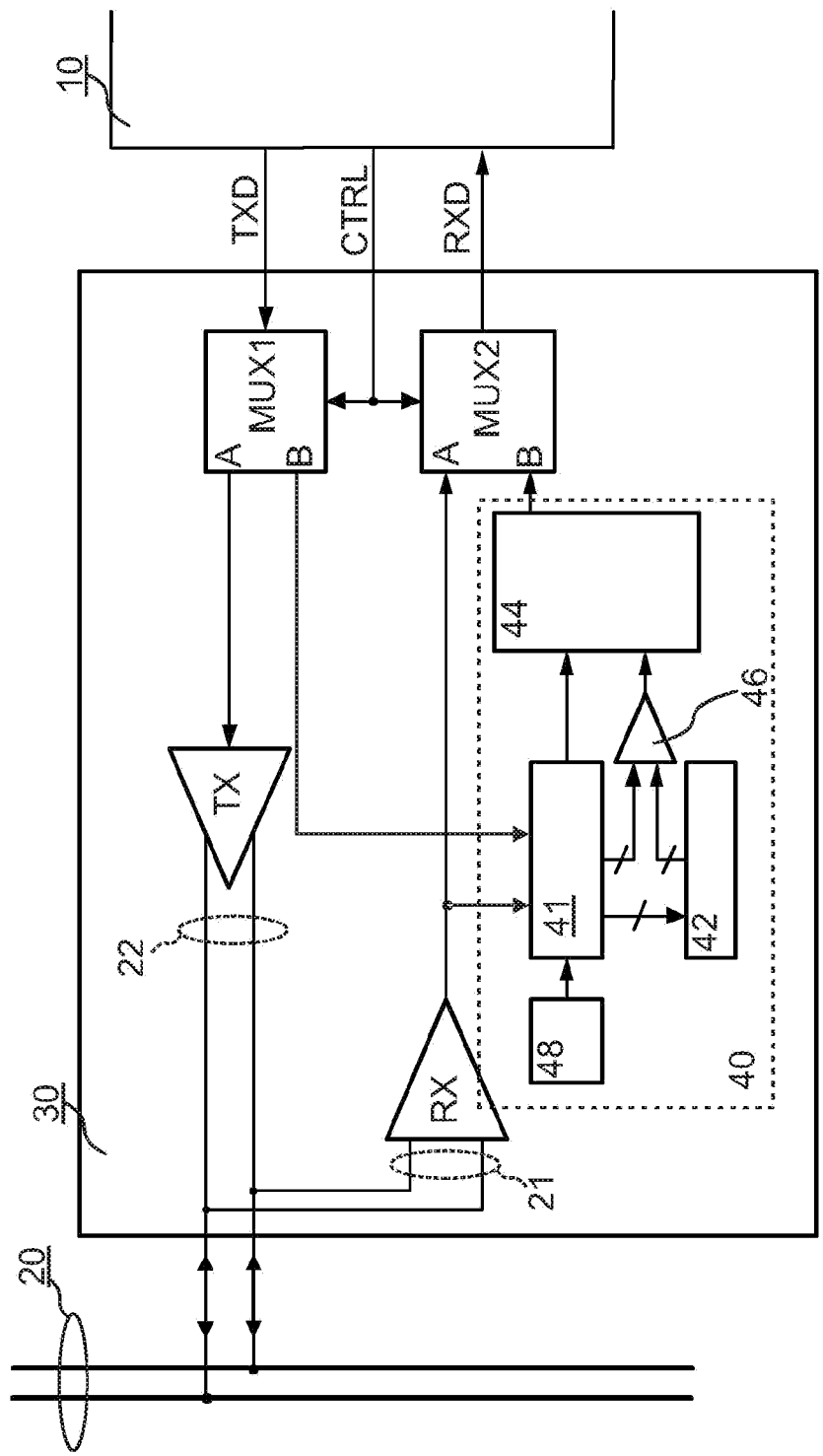
FIG. 3 shows a bus transceiver with a pattern detector with an acknowledgement unit according to the present invention.

With reference to FIG. 3, a bus transceiver and respective method of operation of the bus transceiver is provided, which supports improved system reliability, in particular by enabling an application to check whether a performed configuration of the bus transceiver was successful or not.

Again by means of a control pin CTRL, it is possible to distinguish between two main operation modes A and B. The "normal operation mode", denoted as behaviour (A), will be discussed with reference to FIG. 3, which corresponds to the second operation mode as discussed in connection with FIG. 2, and the "configuration operation mode", denoted as behaviour (B), corresponds to the first operation mode as discussed in connection with FIG. 2.

In the normal behaviour (A) a signal at the transmit pin TXD is forwarded to the lines of the bus 20 through the transmitter component TX, while the signal on the bus 20 is detected with the receiver component RX and forwarded to the output provided to the receive pin RXD. This is a standard operation of the transceiver 30.

Within configuration behaviour (B), a de-multiplexer MUX1 and a multiplexer MUX2 are disconnecting the respective signals at the receive pin RXD and transmit pin TXD from the lines of the bus 20. It is worth to be noted that in FIG. 3 the input pins or output pins, respectively, which are activated in the respective behaviour (A) or (B), are denoted with the letters "A" or "B", respectively.

In behaviour (B), i.e. in the "configuration operation mode", which corresponds to the first operation mode as discussed in connection with FIG. 2, an input signal at transmit pin TXD is routed to a pattern detector 41 of the wake-up detector and configurator block 40. A signal at the receive pin RXD is routed via the pattern detector 41 to an acknowledge and wake-up generator block 44.

In case the wake-up detector and configurator block 40 is receiving signals from the transmit pin TXD, it is further configured to store the received information in a memory 42 and to provide this information to the outside with a number of bits, which depends on the used detector protocol.

In parallel, the acknowledge and wake-up generator block 44 forwards the signal at the transmit pin TXD to the receive pin RXD, thereby feeding back the information to the bus protocol engine or the bus protocol controller embedded in the MCU 10.

Once the complete configuration data is received from the transmit pin TXD, an n-bit comparator 46 is comparing the bits found by the pattern detector 41 with pattern stored as memory content in memory 42. If all n bits are matching, the acknowledge and wake-up generator block 44 is configured to generate an additional pulse to the receive pin RXD. The pulse may be used as protocol acknowledge information.

Moreover, if the pulse length is defined by the used protocol and derived from the configuration bit stream found on transmit pin TXD before, no special configuration of the used baud rate is needed. With the acknowledge pulse, the bus protocol engine of the MCU 10 receives the positive feedback about a successful configuration.

If there is no match, the acknowledge and wake-up generator block 44 can be configured such that no pulse is generated. Instead, the received configuration bits are copied into the memory 42 in order to be interpreted as a new configuration setting.

Further, since no acknowledge pulse is generated, the bus protocol engine of the MCU 10 connected to the transmit pin TXD may repeat the configuration bus message thus trying to re-configure the transceiver 30 again. Such bus message repetition is a normal CAN protocol behaviour.

If this second configuration attempt leads to the same configuration bits within the pattern detector block 41 as stored within the memory 42, the acknowledge and wake-up generator block 44 generates the acknowledge pulse. Thus, the configuration is successfully finished.

In case the pattern detector block 41 is receiving bus signals from the bus pins, it may be configured not to further interpret signals on the transmit pin TXD. Instead the pattern detector block 41 may be configured to monitor the signals on the lines of the bus 20 for a suitable pattern through the receive comparator RX, i.e. in the above described second operation mode.

If the wake-up detector and configurator block 40 has found a known and fixed pattern and the number of the pattern matches with the corresponding bit in the memory 42, the acknowledge and wake-up generator block 44 may be configured to generate a permanent wake-up signal at the receive pin RXD. With such permanent signal on the receive pin RXD the MCU 10 can distinguish an acknowledge pulse from a bus wake-up event.

Finally, block 48 is providing an internal clock source used to support the pattern detector 41 sampling the RX bus input as well as the TXD configuration input.

Summarizing, a transceiver is disclosed that includes a transmit pin configured to receive a signal from a microcontroller, a receive pin configured to transmit a signal to the microcontroller, at least one bus pin configured to transmit and receive signalling to or from the network, a wake-up detector, an acknowledge and/or wake-up generator, and at least one switch is operable to put the transceiver in a first mode of operation. In the first mode of operation the transmit pin is connected to the wake-up detector, and the wake-up detector is configured to activate a wake-up code in accordance with configuration information received at the transmit pin, and the receive pin is connected to an acknowledge and/or wake-up generator, which is configured to provide an acknowledge and/or wake-up signal to the receive pin based on a comparison of actual configuration information stored in the transceiver with the received configuration information from the transmit pin.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single means or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A transceiver, the transceiver comprising:
   a transmit pin configured to receive a signal from a microcontroller;
   a receive pin configured to transmit a signal to the microcontroller;
   at least one bus pin configured to transmit and receive signalling to or from the network;
   a wake-up detector;
   an acknowledge and/or wake-up generator; and
   at least one switch operable to put the transceiver in a first mode of operation, wherein, in the first mode of operation, the transmit pin is connected to the wake-up detector, and the wake-up detector is configured to activate a wake-up code in accordance with a configuration information received at the transmit pin, and the receive pin is connected to an acknowledge and/or wake-up generator, which is configured to provide an acknowledge and/or wake-up signal to the receive pin based on a comparison of an actual configuration information stored in the transceiver with the received configuration information from the transmit pin.

2. A transceiver according to claim 1, wherein the acknowledge and/or wake-up signal comprises a pulse signal, a length of which pulse corresponds to the received configuration information.

3. A transceiver according to claim 1, wherein the acknowledge and the wake-up signal is distinguishable based on a length of a pulse signal.

4. A transceiver according to claim 1, wherein the acknowledge and/or wake-up generator is configured to generate a acknowledge pulse signal at a receive line, if the actual configuration information stored in the transceiver equals an activated wake-up code.

5. A transceiver according to claim 1, wherein the acknowledge and/or wake-up generator is configured to forward the received configuration signal from the transmit pin to the receive pin in order to provide it as feedback in accordance with a bus protocol.

6. A transceiver according to claim 1, wherein the acknowledge and/or wake-up generator is configured to generate no acknowledge or wake-up signal, if the actual configuration information stored in the transceiver is different from the received configuration information.

7. A transceiver according to a claim 1, wherein the transmit pin, receive pin and the at least one bus pin are standard pins.

8. An integrated circuit comprising the transceiver of claim 1.

9. A network comprising:
at least one device;
at least one transceiver respectively connected to the at least one device; and
a data bus connecting the transceivers;
wherein each said transceiver is according to claim 1, and the transmit and receive pins of each transceiver are connected to one of the devices and the at least one bus pin is connected to the data bus.

10. A method of operating a transceiver, the transceiver comprising:
a transmit pin configured to receive a signal from a microcontroller;
a receive pin configured to transmit a signal to the microcontroller;
at least one bus pin configured to transmit and receive signalling to or from the network;
a wake-up detector;
an acknowledge and/or wake-up generator; and
at least one switch operable to put the transceiver in a first mode of operation, wherein, in the first mode of operation,
the method comprising:
connecting the transmit pin to the wake-up detector, and activating a wake-up code in accordance with a configuration information received at the transmit pin, and
connecting the receive pin to an acknowledge and/or wake-up generator, which is configured to provide an acknowledge and/or wake-up signal to the receive pin based on comparing of an actual configuration information stored in the transceiver with the received configuration information from the transmit pin.

* * * * *